(12) United States Patent
Rhoads et al.

(10) Patent No.: US 8,558,427 B2
(45) Date of Patent: Oct. 15, 2013

(54) INSULATION ASSEMBLY FOR ELECTRIC MACHINE

(75) Inventors: Frederick W. Rhoads, Holly, MI (US); David F. Titmuss, Commerce Township, MI (US); Harold Parish, Shelby Township, MI (US); John D. Campbell, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 272 days.

(21) Appl. No.: 13/017,160

(22) Filed: Jan. 31, 2011

(65) Prior Publication Data

US 2012/0194028 A1    Aug. 2, 2012

(51) Int. Cl.
*H02K 3/34*    (2006.01)

(52) U.S. Cl.
USPC .......................................... 310/215; 310/214

(58) Field of Classification Search
USPC .......................................... 310/194, 215, 214
See application file for complete search history.

(56) References Cited

U.S. PATENT DOCUMENTS

| | | | |
|---|---|---|---|
| 5,845,389 A * | 12/1998 | Roberts et al. | 29/596 |
| 6,072,259 A * | 6/2000 | Kawabata et al. | 310/216.115 |
| 7,340,822 B2 * | 3/2008 | Yamamura et al. | 29/598 |
| 2009/0289520 A1 * | 11/2009 | Takeshita et al. | 310/214 |
| 2009/0324435 A1 * | 12/2009 | Sears et al. | 417/423.7 |
| 2010/0253175 A1 | 10/2010 | Kaiser et al. | |
| 2011/0095641 A1 | 4/2011 | Rhoads | |

OTHER PUBLICATIONS

Office Action for U.S. Appl. No. 12/690,143 mailed Oct. 22, 2012.

* cited by examiner

*Primary Examiner* — Tran Nguyen
*Assistant Examiner* — Leda Pham
(74) *Attorney, Agent, or Firm* — Quinn Law Group, PLLC

(57) ABSTRACT

An insulation assembly is provided that includes a generally annularly-shaped main body and at least two spaced-apart fingers extending radially inwards from the main body. The spaced-apart fingers define a gap between the fingers. A slot liner may be inserted within the gap. The main body may include a plurality of circumferentially distributed segments. Each one of the plurality of segments may be operatively connected to another of the plurality of segments to form the continuous main body. The slot liner may be formed as a single extruded piece defining a plurality of cavities. A plurality of conductors (extendable from the stator assembly) may be axially inserted within a respective one of the plurality of cavities. The insulation assembly electrically isolates the conductors in the electric motor from the stator stack and from other conductors.

18 Claims, 3 Drawing Sheets

1

INSULATION ASSEMBLY FOR ELECTRIC MACHINE

STATEMENT REGARDING FEDERALLY SPONSORED RESEARCH OR DEVELOPMENT

This invention was made with U.S. Government support under an Agreement/Project number: DE-EE0002629, awarded by the United States Department of Energy. The United States Government may have certain rights in this invention.

TECHNICAL FIELD

The present invention relates, generally, to an electric motor, and more specifically, to an insulation assembly for a stator assembly of the electric motor.

BACKGROUND

Electric motors include stator assemblies which have conductors for the motor. The stator stack for the stator assembly includes spaced-apart teeth that extend radially from the stator stack and define stator slots. The conductors are threaded into the stator slots and individually twisted into their required positions. Generally, metal tooling is used to assist in maintaining the desired position of the conductors during the assembly and twisting operation. The metal tooling generally has a number of metal fingers that extend radially between the individual conductors being threaded into the stator stack. After assembly is complete, the metal fingers are removed. The conductors must be electrically isolated from the stator stack to prevent phase-to-ground shorts, and from one another to prevent phase-to-phase shorts from occurring.

SUMMARY

An insulation assembly is provided that includes a generally annularly-shaped main body and at least two spaced-apart fingers extending radially inwards from the main body. The spaced-apart fingers define a gap between the fingers. A slot liner may be inserted within the gap. The slot liner may be formed as a single extruded piece defining a plurality of cavities. A plurality of conductors, extendable from the stator assembly, may be axially inserted within a respective one of the plurality of cavities. The insulation assembly electrically isolates the conductors in the electric motor from the stator stack and from other conductors. The insulation assembly also functions as an assembly device, no longer requiring separate metal tooling to assist in maintaining the position of the conductors.

The main body may include a plurality of circumferentially distributed segments. Each one of the plurality of segments may be operatively connected to another of the plurality of segments to form the continuous main body. A plurality of attachment features may be spaced about the main body. The main body may be made of a moldable plastic material. The slot liner may include an end wall defining a first inwardly tapered portion. The slot liner may include a side wall defining a second inwardly tapered portion. The first and second inwardly tapered portions may be adapted to retain the slot liner in the gap.

Each of the spaced-apart fingers may have at least one side which defines a chamfer. The chamfer may be adapted to align respective ones of the plurality of slot liners. Each of the spaced-apart fingers has at least one side which defines an angled surface. The angled surface may be adapted to guide insertion of the slot liner in the gap. Each of the spaced-apart fingers has at least one side which defines a curved surface. The curved surface may be adapted to guide the insertion of each of said plurality of conductors in the respective one of the plurality of cavities. A method of assembling a stator assembly is also provided.

The above features and advantages and other features and advantages of the present invention are readily apparent from the following detailed description of the best modes for carrying out the invention when taken in connection with the accompanying drawings.

DETAILED DESCRIPTION

Figure 1:
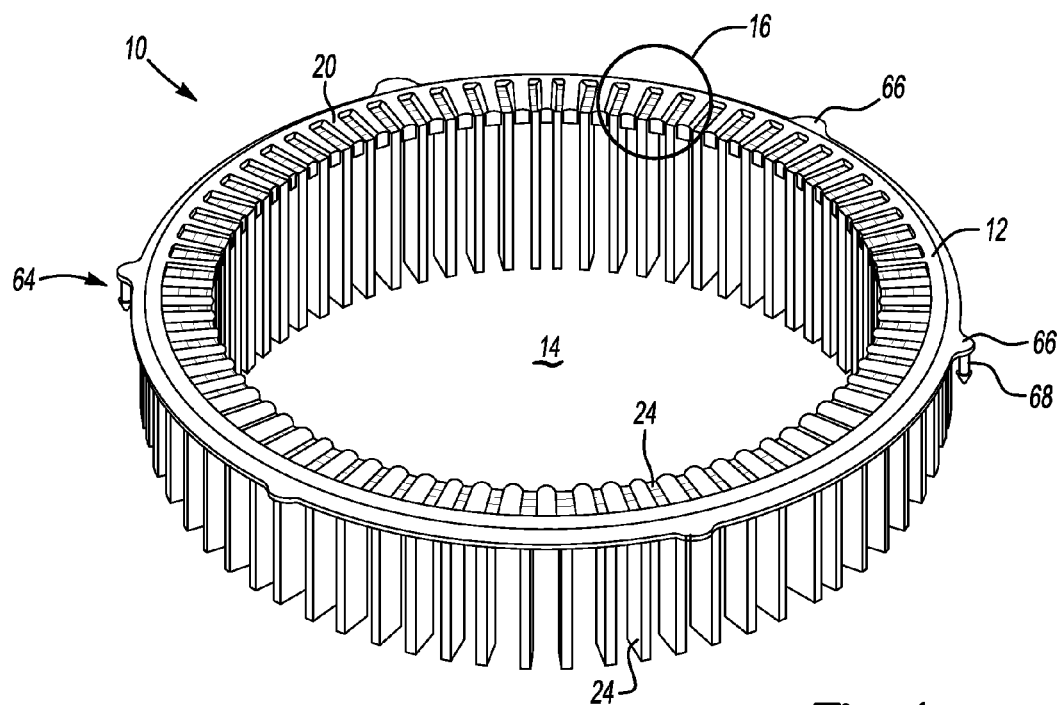
FIG. 1 is a schematic perspective view of an insulation assembly in accordance with the present disclosure.
Figure 2:
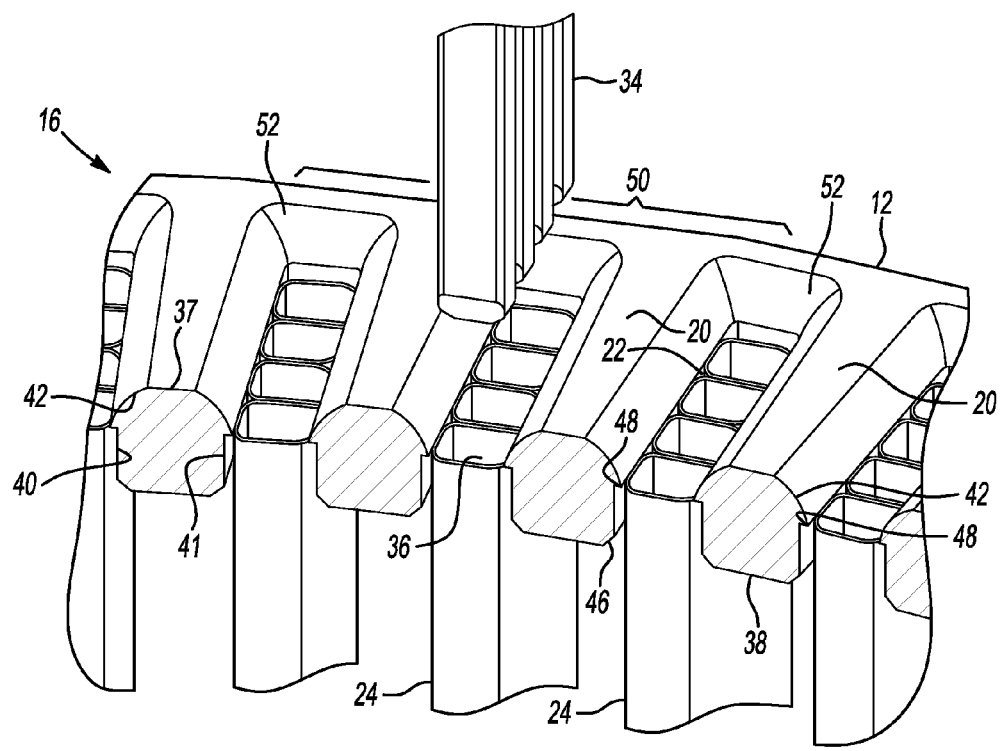
FIG. 2 is an enlarged partial schematic perspective view of a portion of the insulation assembly of FIG. 1.

Referring to the Figures, wherein like reference numbers refer to the same or similar components throughout the several views, FIG. 1 is a schematic perspective view of an insulation assembly 10. The insulation assembly 10 includes a generally annularly-shaped main body 12 surrounding a central opening 14. FIG. 2 is an enlarged partial schematic perspective view of a portion 16 of the insulation assembly 10, looking outward from the center of the opening 14. The insulation assembly 10 includes at least two spaced-apart fingers 20 extending from the main body 12 and protruding radially inwards toward the central opening 14. The spaced-apart fingers 20 define a gap 22 in between the fingers 20. A slot liner 24 may be inserted or adapted to fit into each gap 22. The slot liner 24 engages with the fingers 20 to provide a complete insulation system for the stator assembly 26.

Figure 3:
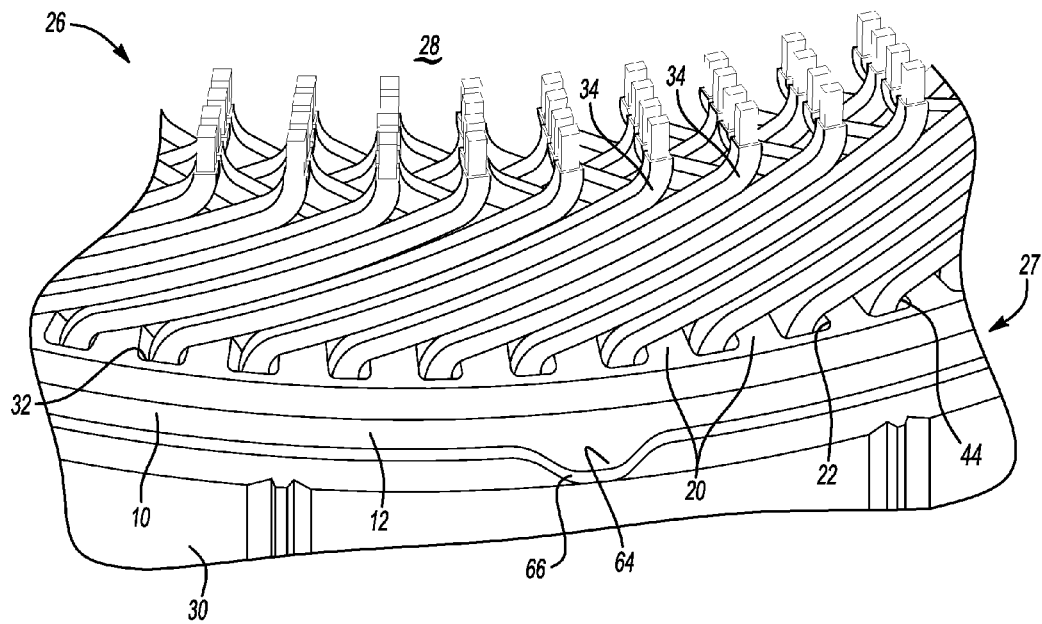
FIG. 3 is a partial schematic perspective view of the insulation assembly of FIG. 1 on a twist-side of a stator assembly.

Referring to FIG. 3, the insulation assembly 10 may be used in a stator assembly 26 for an electric motor 27. FIG. 3 is a partial schematic perspective view of the insulation assembly 10 from a twist-side 28 of the stator assembly 26. The insulation assembly 10 may be attached to one or both of the twist side 28 and a crown side (not shown) of the stator assembly 26. The stator assembly 26 includes a stator stack 30. The stator stack 30 for the stator assembly 26 defines a plurality of stator slots 32 (shown in FIG. 3) which extend entirely through the stator stack 30. Each gap 22 in the insulation assembly 10 corresponds to one of the stator slots 32 in the stator stack 30.

The slot liner 24 may be a multi-lumen slot liner 24 that defines a plurality of cavities 36, as shown in FIG. 2. A plurality of conductors 34 (shown in FIGS. 2-3) are threaded through respective ones of the plurality of cavities 36. The conductors 34 extend from both the twist-side 28 and the crown side (not shown) of the stator stack 30. The insulation assembly 10 electrically isolates the conductors 34 from one another and from the ends of the stator stack 30. The number and shape of the cavities 36 are determined by the number and shape of conductors 34 which are assembled within each stator slot 32. In the embodiment shown, there are four conductors 34 per stator slot 32. The conductors 34 may be formed from wire having a square cross-sectional shape. The number and shape of the conductors 34, and thus cavities 36, may vary according to the design and purpose of the electric motor 27. One skilled in the art would be able to determine the appropriate number and shape of the conductors 34 and cavities 36 for a particular configuration.

The slot liner 24 may be formed as a one-piece slot liner 24 by extrusion from a dielectric material. Providing an extruded slot liner 24 reduces the number of burrs and folds in the material of the slot liner 24, making it less susceptible to tearing during insertion or due to relative motion between the slot liner 24 and the stator stack 30. Alternatively, the slot liner 24 may be formed by bonding together individually extruded straws (each defining a single cavity) to form a single piece slot liner 24 assembly having multiple cavities.

A method of assembly for the stator stack 30 includes attaching the main body 12 and the spaced apart fingers 20 (that extend from the main body 12) onto the stator stack 30. The slot liner 24 may be inserted into the gap 22 between adjacent fingers 20. The conductors 34 may be inserted into the individual cavities 36 defined by the slot liner 24. The slot liner 24 may be pre-cut to the required length for a particular electric motor 27. Alternatively, the slot liner 24 may be provided as a continuous roll and cut to length at the time of assembly within the stator stack 30. Thus the length of the slot liner 24 may be selected as required by the application. Because the insulation assembly 10 may be assembled on the stator stack 30 prior to insertion of the conductors 34, the insulation assembly 10 may act as an assembly device to assist in assembly of the stator assembly 26.

The fingers 20 may include a first surface 37 and a second surface 38, shown in FIG. 2. The first surface 37 and the second surface 38 are connected by a first side 40 and second side 41. The first side 40 and second side 41 each define a curved surface 42. The curved surface 42 (shown in FIG. 2) may correspond to a curve 44 (shown in FIG. 3) of the conductors 34. In other words, the radius of the curved surface 42 (shown in FIG. 2) may correspond to the desired radius of a curve 44 (shown in FIG. 3) on the conductors 34 once the twist operation is complete. The curved surface 42 assists in aligning the conductors 34 during assembly and preventing movement, i.e. pulling, of the conductors 34 during the twist operation. The first side 40 and second side 41 of the fingers 20 also each define an angled surface 46. The angled surface 46 assists in guiding the placement of slot liner 24 into the gap 22 between adjacent fingers 20. By having an angled surface 46 instead of a sharp edge, damage to the slot liner 24 during assembly may be minimized.

The first side 40 and second side 41 of the fingers 20 each define a chamfer 48. The chamfer 48 is located at the same axial position on the stator stack 30 as the slot liner 24. Thus, the chamfer 48 aligns the slot liner 24 in the desired axial position relative to the stator stack 30. The chamfer 48 also protects the slot liner 24 during assembly of the stator assembly 26 and reduces the stress placed on the ends of the slot liner 24 from the conductors 34. The cross-sectional shape of the fingers 20 may vary from one application to another depending on the application and the specific stator assembly 26 being used. Any shape according to the specific stator assembly may be employed. Fingers 20 also define an inner wall 52.

The embodiment described above is for a stator assembly 26 having axially inserted conductors 34. However, the insulation assembly 10 may also be utilized with radially inserted conductors 34 as well. Because the insulation assembly 10 is an electrical isolator, the insulation assembly 10 can remain with the stator assembly 26 once the assembly is complete and not effect operation of the stator assembly 26. A second insulation assembly (not shown) may be assembled on the stator stack 30 prior to insertion of the plurality of conductors 34 from the crown-side (not shown) of the stator stack 30. The second insulation assembly may have a common shape with the insulation assembly that is located on the twist side 28 of the stator stack 30.

Figure 4:
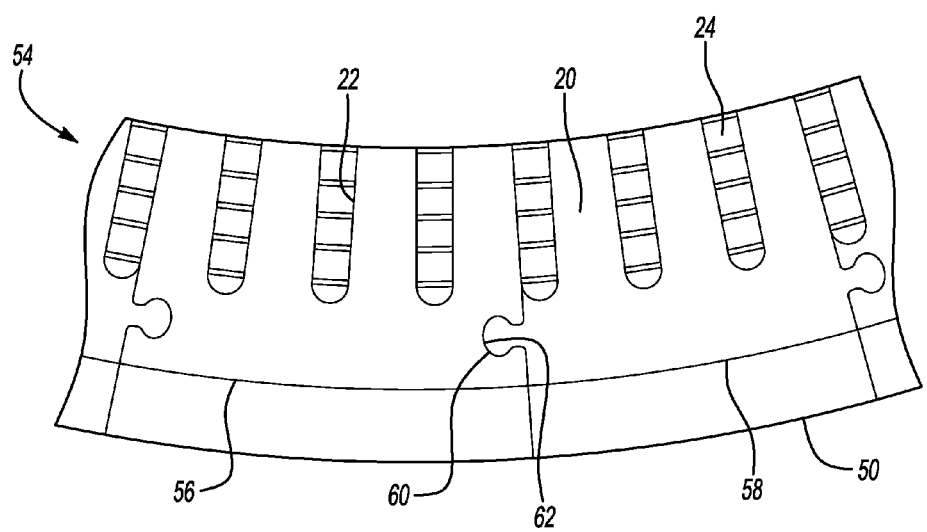
FIG. 4 is a partial schematic plan view of a portion of the insulation assembly of FIG. 1.

The generally annularly-shaped main body 12 may be formed as a single piece, as shown in FIG. 1. Optionally, the main body 12 may be formed as a number of segments 50 (shown in FIGS. 2 and 4) that are circumferentially distributed. FIG. 4 is a partial schematic plan view of a portion 54 of the insulation assembly 10. FIG. 4 shows a first segment 56 and a second segment 58. The first segment 56 is operatively connected to the second segment 58 through a first portion 60 that is shaped to fit into a corresponding second portion 62. Each segment 50 is operatively connected to another two segments in order to form a closed, continuous ring, as shown in FIG. 1. Any configuration or shape may be employed for keying or retention of the segments 50.

Optionally, the segments 50 may be attached using adhesive or any suitable material. The segments 50 may be connected to each other to form a continuous annularly-shaped main body 12 prior to being positioned or assembled on the stator stack 30. Alternatively, the segments 50 may be individually and sequentially placed on the stator stack 30 and then assembled into a continuous annularly-shaped main body 12.

Optionally, attachment features 64 (shown in FIG. 1) may be located at various locations of the main body 12. The attachment features 64 may be used to secure the insulation assembly 10 to the stator stack 30. The attachment features 64 may include a tab 66 (shown in FIGS. 1 and 3) which protrudes radially outward from the main body 12. A pin 68 (shown in FIG. 1) may extend from the tab 66 and be shaped to fit into a corresponding hole (not shown) formed in the stator stack 30.

The main body 12, fingers 20 and slot liner 24 may be made from an electrically isolating material, such as plastic. The main body 12 may be manufactured by injection molding. Optionally, the main body 12 may be manufactured from a conductive material and coated in an electrically isolating material.

Figure 5:
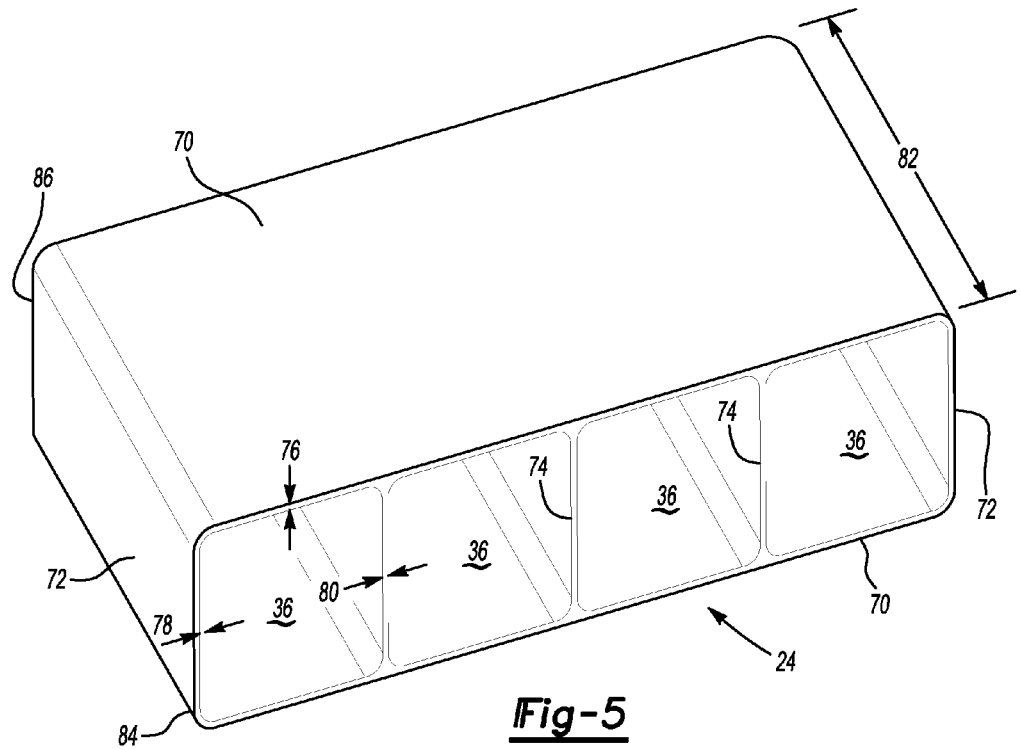
FIG. 5 is a partial schematic perspective view of a slot liner for use in the insulation assembly of FIGS. 1.

FIG. 5 is a partial schematic perspective view of a slot liner 24. As noted above, the slot liner 24 may be a multi-lumen slot liner 24 that defines a plurality of cavities 36. The slot liner 24 has a pair of opposing side walls 70, a pair of opposing end walls 72, and at least one dividing wall 74. The opposing side walls 70 have a first thickness 76, the opposing end walls 72 have a second thickness 78, and the dividing walls 74 have a third thickness 80. The slot liner 24 may be extruded as a single piece so that the dividing walls 74 do not have double thickness, as sometimes occurs when bending sheets of material to form the desired shape. In order to reduce the package area required by the slot liner 24 and the conductors 34, the slot liner 24 may be formed with side walls 70, end walls 72, and dividing walls 74 having the smallest thickness possible while maintaining electrical isolation.

In the embodiment shown, the first, second, and third thicknesses 76, 78, 80 are equal such that the side walls 70, end walls 72, and dividing walls 74 are of equal thickness. Alternatively, the first thickness 76, the second thickness 78, and/or the third thickness 80 may be different thicknesses to provide different amounts of electrical isolation. For example, end walls 72 may require less electrical isolation than the dividing walls 74 and therefore the second thickness 78 may be less than the third thickness 80. One skilled in the art would be able to determine the required thickness for each of the side walls 70, end walls 72, or dividing walls 74.

Additionally, the side walls 70, the end walls 72, and the dividing walls 74 enclose the cavities 36 around a portion of the length of the conductor 34. The ends of the conductor 34, which extend axially from the stator stack 30, remain exposed as required for operation of the electric motor 27.

The slot liner 24 has a length 82, a first end 84 and a second end 86. The first end 84 of the slot liner 24 is fittable or adapted to fit into the gap 22 that is in between adjacent fingers 20. The slot liner 24 may be attached or fused to the first and second sides 40, 41 of the fingers 20 with adhesive or any other suitable material. Any suitable method of attaching or fusing may be used. One such method includes applying ultrasonic vibrations locally while holding the pieces together under pressure in order to create an ultrasonic bond. Optionally, the slot liner 24 may be integrally formed with the main body 12.

Figure 6:
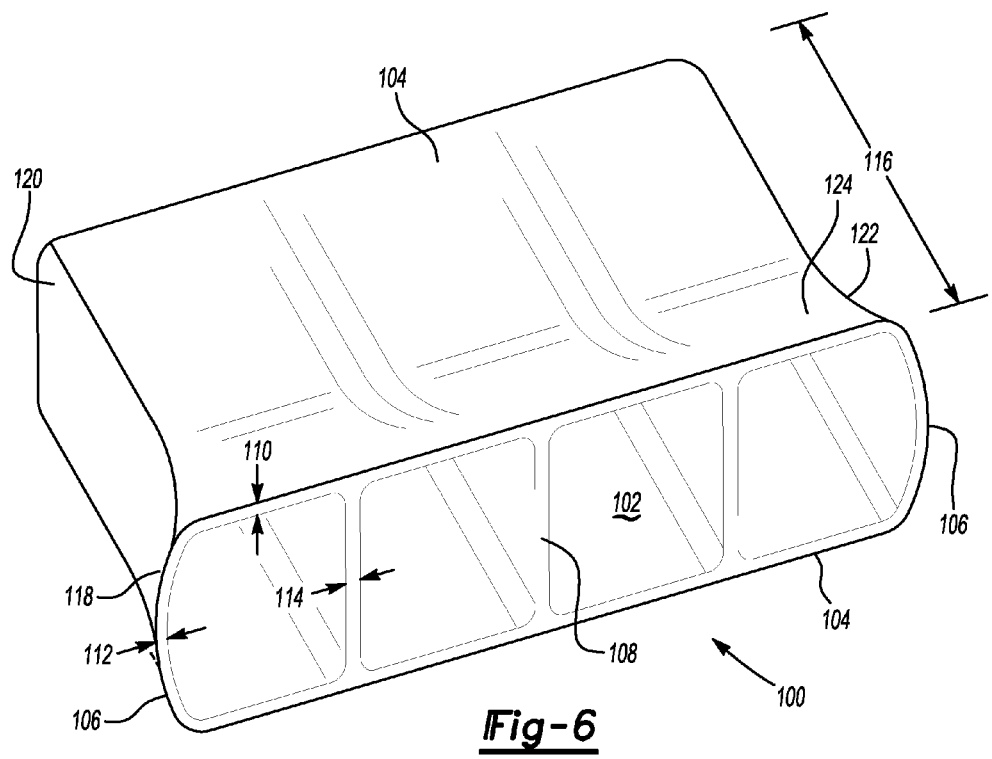
FIG. 6 is a partial schematic perspective view of an alternative embodiment of a slot liner for use in the insulation assembly of FIG. 1.

FIG. 6 illustrates an alternative embodiment for a slot liner 100. The slot liner 100 includes a plurality of cavities 102 fully enclosed by a pair of opposing side walls 104, a pair of opposing end walls 106 and at least one dividing wall 108. In the embodiment shown, there are four cavities 102, however, any number of cavities may be formed to hold a corresponding number of conductors. The opposing side walls 104 have a first thickness 110, the opposing end walls 106 have a second thickness 112, and the dividing walls 108 have a third thickness 114. The slot liner 100 has a length 116, a first end 118 and a second end 120. The slot liner 100 is inserted into the gap 22 between adjacent fingers 20 of the insulation assembly 10.

Referring to FIG. 6, the slot liner 100 may define a first tapered portion 122 at one or both of the end walls 106. The slot liner 100 may define a second tapered portion 124 at one or both of the opposing side walls 104. The first and second tapered portions 122, 124 may be inwardly tapered and formed at the first end 118 of the slot liner 100. The slot liner 100 may have a length 116 that is longer than the length of the stator stack 30, to account for the first and second tapered portions 122, 124.

When the slot liner 100 is inserted into the gap 22 between adjacent fingers 20, the first tapered portion 122 may be adapted to be in contact with or rest above the inner wall 52 of the fingers 20 (shown in FIG. 2). When the slot liner 100 is inserted into the gap 22 between adjacent fingers 20, the second tapered portion 124 may be adapted to be in contact with or rest above the curved surface 42 of the fingers 20. The first and second tapered portions 122, 124 may prevent the slot liner 100 from falling through the fingers 20 and into the stator stack 30. In other words, the first and second tapered portions 122, 124 may assist in retaining the position of the slot liner 100 in the gap 22 without the use of adhesives, fusing, or other materials.

While the best modes for carrying out the invention have been described in detail, those familiar with the art to which this invention relates will recognize various alternative designs and embodiments for practicing the invention within the scope of the appended claims.

The invention claimed is:

1. An insulation assembly for a stator assembly comprising:
   a generally annularly-shaped main body;
   at least two spaced-apart fingers extending radially inwards from the main body;
   wherein the spaced-apart fingers define a gap between the spaced-apart fingers;
   a slot liner insertable within the gap;
   wherein each of the at least two spaced-apart fingers includes respective sides and each of the respective sides defines a respective chamfer; and
   wherein the slot liner is configured to abut at least one of the respective chamfers.

2. The insulation assembly of claim 1, wherein the main body includes a plurality of circumferentially distributed segments; and each one of the plurality of segments is operatively connected to another of the plurality of segments.

3. The insulation assembly of claim 1, wherein:
   the at least one side of each of the spaced-apart fingers defines an angled surface adapted to guide insertion of the slot liner in the gap; and
   the angled surface is axially spaced from the chamfer.

4. The insulation assembly of claim 1, further comprising a plurality of attachment features spaced about the main body.

5. The insulation assembly of claim 1, wherein the main body is made of a moldable plastic material.

6. The insulation assembly of claim 1, wherein:
   the slot liner defines a length between a first end and a second end;
   the slot liner includes an end wall defining a first inwardly tapered portion extending along the length of the slot liner.

7. The insulation assembly of claim 6, wherein:
   the slot liner defines a length between a first end and a second end;
   the slot liner includes a side wall defining a second inwardly tapered portion extending along the length of the slot liner.

8. The insulation assembly of claim 1, wherein the slot liner is formed as a single extruded piece defining a plurality of cavities.

9. The insulation assembly of claim 8, further comprising a plurality of conductors extendable from the stator assembly, each of the plurality of conductors being axially inserted within a respective one of the plurality of cavities.

10. The insulation assembly of claim 9, wherein each of the spaced-apart fingers has at least one side which defines a curved surface adapted to guide the insertion of said each of the plurality of conductors in the respective one of the plurality of cavities.

11. A method of assembling a stator assembly comprising:
   positioning a generally annularly-shaped main body on a stator stack, the main body including at least two spaced-apart fingers extending radially inwards from the main body, the spaced-apart fingers defining a gap;
   wherein each of the at least two spaced-apart fingers includes respective sides and each of the respective sides defines a respective chamfer;
   inserting a slot liner within the gap defined by the spaced-apart fingers such that the slot liner is located at a same axial position as at least one of the respective chamfers, the slot liner defining a plurality of cavities; and
   threading each of a plurality of conductors into a respective one of the plurality of cavities.

12. The method of claim 11, further comprising operatively connecting one of a plurality of circumferentially-distributed segments of the main body to another of the plurality of circumferentially-distributed segments prior to the positioning of the main body on the stator stack.

13. The method of claim 11, further comprising twisting the plurality of conductors to align with a respective curved surface on each of the spaced-apart fingers.

14. The method of claim 11, further comprising extruding the slot liner as a single piece prior to inserting the slot liner within the gap.

15. An insulation assembly for a stator assembly comprising:
- a generally annularly-shaped main body;
- a plurality of spaced apart fingers extending radially inwards from the main body;
- wherein the plurality of fingers define a plurality of gaps;
- a plurality of slot liners each positioned within a respective one of the plurality of gaps;
- wherein each of the plurality of slot liners defines a respective length between respective first and second ends;
- wherein each of the plurality of slot liners includes a respective end wall defining a respective first inwardly tapered portion extending along the respective length;
- wherein each of the plurality of slot liners includes a respective side wall defining a respective second inwardly tapered portion extending along the respective length.

16. The insulation assembly of claim 1, wherein the slot liner is integrally formed with the main body.

17. The insulation assembly of claim 15, wherein the slot liner is integrally formed with the main body.

18. The insulation assembly of claim 15, wherein:
- wherein each of the plurality of spaced-apart fingers has at least one respective side which defines a respective chamfer; and
- wherein each of the plurality of slot liners is configured to abut the respective chamfer.

* * * * *